US012658623B2

(12) United States Patent
Wozniak et al.

(10) Patent No.: US 12,658,623 B2
(45) Date of Patent: Jun. 16, 2026

(54) SINGLE PIECE CONNECTOR FOR CONNECTING TWO CIRCUIT ELEMENTS

(71) Applicant: Neoconix, Inc., San Jose, CA (US)

(72) Inventors: Bohdan Wozniak, Warrington, PA (US); David Chen, Los Altos, CA (US); Tan Nguyen, Santa Clara, CA (US); Woody Maynard, State College, PA (US)

(73) Assignee: Neoconix, Inc., San Jose, CA (US)

( * ) Notice: Subject to any disclaimer, the term of this patent is extended or adjusted under 35 U.S.C. 154(b) by 389 days.

(21) Appl. No.: 18/365,235

(22) Filed: Aug. 4, 2023

(65) Prior Publication Data

US 2025/0047022 A1 Feb. 6, 2025

(51) Int. Cl.

*H01R 12/78* (2011.01)
*H01R 12/70* (2011.01)
*H01R 12/73* (2011.01)
*H01R 12/79* (2011.01)

(52) U.S. Cl.

CPC ......... *H01R 12/78* (2013.01); *H01R 12/7005* (2013.01); *H01R 12/73* (2013.01); *H01R 12/79* (2013.01)

(58) Field of Classification Search

CPC ....... H01R 12/73; H01R 12/78; H01R 12/732
USPC ......................... 439/631, 638, 723, 787, 498
See application file for complete search history.

(56) References Cited

U.S. PATENT DOCUMENTS

| | | | | | |
|---|---|---|---|---|---|
| 3,205,471 | A * | 9/1965 | Herrmann | H01R 12/7082 | 439/631 |
| 3,365,696 | A * | 1/1968 | Wagner | H01R 31/00 | 439/631 |
| 3,686,622 | A * | 8/1972 | Bonhomme | H01R 4/52 | 439/787 |
| 3,858,163 | A * | 12/1974 | Goodman | H01R 12/721 | 439/631 |
| 4,637,677 | A * | 1/1987 | Barkus | H01R 4/52 | 439/724 |
| 4,743,080 | A * | 5/1988 | Siraty | H01R 12/613 | 439/492 |
| 4,747,790 | A * | 5/1988 | Masuda | H01R 12/83 | 439/631 |
| 5,460,546 | A * | 10/1995 | Kunishi | H01R 12/79 | 439/62 |
| 5,531,615 | A * | 7/1996 | Irlbeck | H01R 12/714 | 439/631 |
| 5,928,036 | A * | 7/1999 | Thrush | H01R 12/716 | 439/631 |

(Continued)

*Primary Examiner* — Hae Moon Hyeon

(57) ABSTRACT

A single piece electrical connector for connecting two circuit elements incudes a housing and an interconnection member provided therein with an array of electrically conductive and elastic spring contact elements provided on the interconnection member to interconnect the two circuit elements electrically and mechanically in a stacked or coplanar configuration. In some embodiments, the single piece electrical connector connects to interconnection terminals of each circuit element by the application of a force normal to the surfaces of the circuit elements. In some embodiments, the housing of the connector is configured to apply and maintain the normal force between the elastic spring contact elements of the connector and the interconnection terminals of the circuit elements to form low resistance interconnections therebetween.

21 Claims, 11 Drawing Sheets

(56) References Cited

U.S. PATENT DOCUMENTS

| | | | | |
|---|---|---|---|---|
| 6,508,661 | B1 * | 1/2003 | Yu | H01R 12/79 439/495 |
| 6,511,349 | B2 * | 1/2003 | Ishikawa | H01R 12/87 439/630 |
| 7,056,131 | B1 | 6/2006 | Williams | |
| 7,371,073 | B2 | 5/2008 | Willaims | |
| 7,758,351 | B2 | 7/2010 | Brown et al. | |
| 9,722,328 | B2 * | 8/2017 | Wimmer | H01R 43/16 |
| 2012/0190219 | A1 * | 7/2012 | Pai | H01R 12/721 439/65 |
| 2016/0344118 | A1 | 11/2016 | Hsieh et al. | |

* cited by examiner

SINGLE PIECE CONNECTOR FOR CONNECTING TWO CIRCUIT ELEMENTS

FIELD OF THE INVENTION

The invention relates to an electrical connector for electrically interconnecting two or more circuit elements within an electronic system and, in particular, to an electrical connector for electrically interconnecting rigid or flexible printed circuits.

BACKGROUND OF THE INVENTION

Complex electronic devices such as computers, laptop computers, workstations, servers, tablets, mobile phones, printers, routers, and other devices require electrical interconnections between subcomponents within the device. For example, in mobile phones and tablets, electronic device modules such as a camera module or a fingerprint sensor module or a memory module are frequently interconnected to the phone's mother board or main logic board (MLB), being the main printed circuit board (PCB) within the system, using flexible printed circuits (FPCs). External connectors such as universal serial bus (USB) ports are also frequently interconnected to the mother board using a flexible printed circuit. Flexible printed circuits are used for interconnection of many other electronic elements, including, but not limited to, PCB to PCB, module to PCB, socket to PCB, and integrated circuit (IC) Package to PCB, in a wide variety of electronic and electrical devices.

Flexible printed circuits, by the nature of their flexibility, have advantages over other printed circuit types. FPCs are able to accommodate variations in the distance between circuit elements or electronic components which they are interconnecting, where those variations may be due to mechanical tolerances or to design modifications from product generation to product generation or from initial product design to final product launch. FPCs can be bent, curved, wrapped, folded, twisted, or otherwise shaped to interconnect components located remotely from each other, and/or located on different planes and in different orientations. FPCs can also facilitate fitting circuit elements into constrained volumes within an electronic device whereby the FPCs are folded, bent, or flexed repeatedly, such as the flexible circuit that interconnects the folding display to the mother board in the chassis of a laptop, or those used to interconnect the read head assembly of hard disk drives.

FPCs can be attached to electronic elements, components, subcomponents, modules, PCBs, and other electronic circuit elements either separably or permanently. Examples of permanent electrical interconnections of FPCs to electronic elements can include soldered interconnections, such as hot bar soldering, as well as those formed using electrically conductive adhesives. Examples of separable interconnections can include separable electrical connectors such as zero insertion force (ZIF) connectors and two-piece mezzanine connectors. In the case of rigid-flex printed circuits, one end of a flexible printed circuit is embedded within or laminated upon a rigid PCB, and interconnected using plated through holes (PTH), plated vias, or by other permanent means. As such, the flexible circuit can be considered, with the associated rigid region of the PCB, as a unitary body with the rigid PCB.

There are instances where it is useful and/or beneficial to form electrical interconnections directly between two separate flexible printed circuits (FPCs), or between an FPC and the flexible circuit portion of a rigid-flex printed circuit, or between the flexible circuit portions of two rigid-flex printed circuits. For example, connecting two separate flexible printed circuits may aid in simplification of system design, facilitate system design changes, and simplify product assembly.

SUMMARY OF THE INVENTION

The present disclosure discloses an electrical connector, substantially as shown in and/or described below, for example in connection with at least one of the figures, as set forth more completely in the claims.

In some embodiments, an electrical connector for electrically interconnecting a first circuit element to a second circuit element includes a housing having a first insertion slot with an associated first bearing surface and a second insertion slot with an associated second bearing surface, the first and second insertion slots being provided on opposing ends of the housing; and an interconnection member provided in the housing, the interconnection member having a first set of contact elements and a second set of contact elements, at least one contact element in the first set of contact elements being electrically connected to at least one contact element in the second set of contact elements. The electrical connector is configured to receive a first circuit element in the first insertion slot and to receive a second circuit element in the second insertion slot. The first bearing surface applies a force normal to the first circuit element to compress the first circuit element against the first set of contact elements and the second bearing surface applies a force normal to the second circuit element to compress the second circuit element against the second set of contact elements.

These and other advantages, aspects and novel features of the present invention, as well as details of an illustrated embodiment thereof, will be more fully understood from the following description and drawings.

BRIEF DESCRIPTION OF THE DRAWINGS

Various embodiments of the invention are disclosed in the following detailed description and the accompanying drawings. Although the drawings depict various examples of the invention, the invention is not limited by the depicted examples. It is to be understood that, in the drawings, like reference numerals designate like structural elements. Also, it is understood that the depictions in the figures are not necessarily to scale.

DETAILED DESCRIPTION OF THE INVENTION

Figure 1:
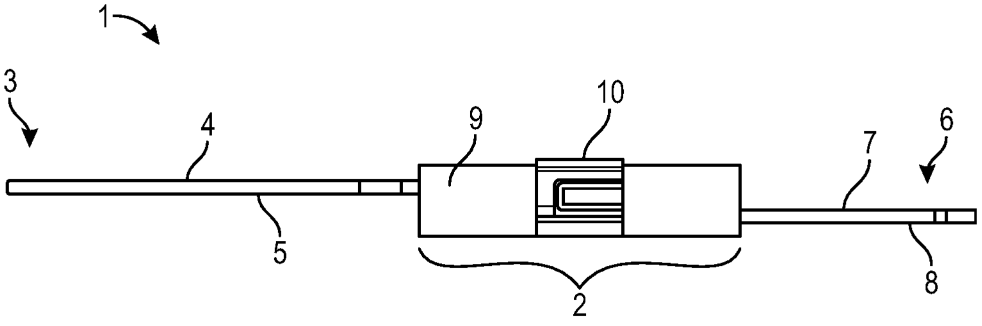
FIG. 1 is a cross-sectional view of an interconnection assembly using the electrical connector of the present invention for interconnecting two flexible printed circuits in a stacked configuration in some embodiments.

In embodiments of the present invention, a single piece electrical connector for connecting two circuit elements incudes a housing and an interconnection member provided therein with an array of electrically conductive and elastic spring contact elements provided on the interconnection member to interconnect the two circuit elements electrically and mechanically in a stacked or coplanar configuration. In some embodiments, the single piece electrical connector connects to interconnection terminals of each circuit element by the application of a force normal to the surfaces of the circuit elements. In some embodiments, the housing of the connector is configured to apply and maintain the normal force between the elastic spring contact elements of the connector and the interconnection terminals of the circuit elements to form low resistance interconnections therebetween. In some embodiments, the connector housing has an internal bearing surface opposite the clastic spring contact elements which forces the circuit elements to make contact with and compress against the elastic spring contact elements to form the low resistance connections with the interconnection terminals of the circuit elements. In some embodiments, a retention clip is provided to retain the circuit elements within the connector housing. In further embodiments, the electrical connector receives the circuit elements from opposing ends of the body of the housing.

The single piece electrical connector of the present invention can be applied to electrically interconnect various types of circuit elements, including interconnecting two flexible printed circuit (FPCs), a FPC and a flat flex tail or flat flex cable (FFC) (such as copper strips), a FPC and the flexible portion of a rigid-flex printed circuit, between the flexible portions of two rigid-flex circuits, or two ultra-thin rigid printed circuit substrates. In one example, the electrical connector is applied to connect a modular subsystem, such as a cell phone camera or a sensor, which is mounted on a flexible printed circuit, to a mating circuit element such as an FPC.

In embodiments of the present invention, the electrical connector is a floating connector. In the present description, the single piece electrical connector is a 'floating' connector in that the connector is not mounted on a rigid printed circuit substrate, and does not require mounting or attachment to another structure in an electronic device, such as the housing or support member of a mobile phone. As such the connector may be thought of as being analogous to a wire nut used to connect two electrical wires in a junction box in home wiring, in that the wire nut forms an electrical interconnection between two flexible conductors but can be moved with those conductors to any position desired within the junction box, such as the box surrounding an electrical switch. In some examples, the floating single piece electrical connector of the present invention can be used to connect two FPCs in an electronic device such that the connector can be moved with the FPCs within the housing of the electronic device.

The electrical connector of the present invention realizes many advantages over conventional connectors. First, the electrical connector of the present invention provides a low profile, high performance and reliable electrical interconnection between two circuit elements in an electronic system or device. In particular, the electrical connector enables interconnection to be made without the use of high temperature processing, such as without solder reflow. In one example, the electrical connector of the present invention can be applied to interconnect flexible printed circuits having different thicknesses or having the same thickness. In some further examples, the electrical connector of the present invention can be applied to electrically interconnect two ultra-thin rigid printed circuit substrates, for example printed circuit substrates with overall thickness in the range of 25 to 100 μm and more commonly from 35 to 75 μm. In another example, the electrical connector of the present invention is applied to electrically interconnect an FPC to an ultra-thin rigid printed circuit substrate.

Second, the electrical connector of the present invention is tolerant of shock and vibration, without permanent or intermittent loss of electrical continuity through the interconnection. In particular, the electrical connector includes elastic spring contacts having a high degree of mechanical and electrical compliance, thereby providing reliable interconnection with a high tolerance of mechanical shock and vibration without suffering transient or permanent opens.

Third, the electrical connector of the present invention facilitates low cost assembly and enables high volume manufacturing with and high yield.

Fourth, the electrical connector of the present invention enables permanent or semi-permanent assembly to a mating circuit element without requiring complex and costly tooling. The electrical connector facilitates miniaturization and cost-reduction of the interconnection members in an electronic device. In particular, the electrical connector of the present invention is capable of surviving multiple mating and de-mating operations in order to facilitate test, rework, validation and repair of electronic devices and components.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this section is contrary to or otherwise inconsistent with a definition set forth in the patents, applications, published applications, and other publications that are herein incorporated by reference, the definition set forth in this section prevails over the definition that is incorporated herein by reference.

Unless otherwise indicated or the context suggests otherwise, as used herein, "a" or "an" means "at least one" or "one or more."

This description may use relative spatial and/or orientation terms in describing the position and/or orientation of a component, apparatus, location, feature, or a portion thereof. Unless specifically stated, or otherwise dictated by the context of the description, such terms, including, without limitation, top, bottom, above, below, under, on top of, upper, lower, left of, right of, in front of, behind, next to, adjacent, between, horizontal, vertical, diagonal, longitudinal, transverse, radial, axial, etc., are used for convenience in referring to such component, apparatus, location, feature, or a portion thereof in the drawings and are not intended to be limiting.

Furthermore, unless otherwise stated, any specific dimensions mentioned in this description are merely representative of an exemplary implementation of a device embodying aspects of the disclosure and are not intended to be limiting.

Figure 2:
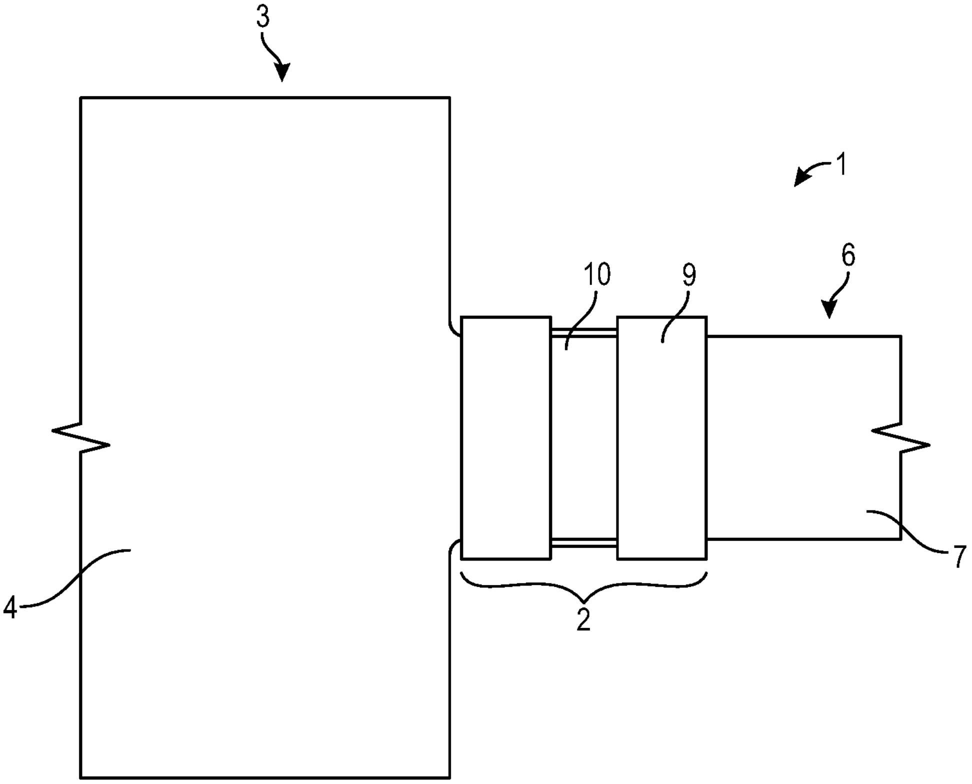
FIG. 2 is a top view of a portion of the interconnection assembly of FIG. 1 in some embodiments.
Figure 3:
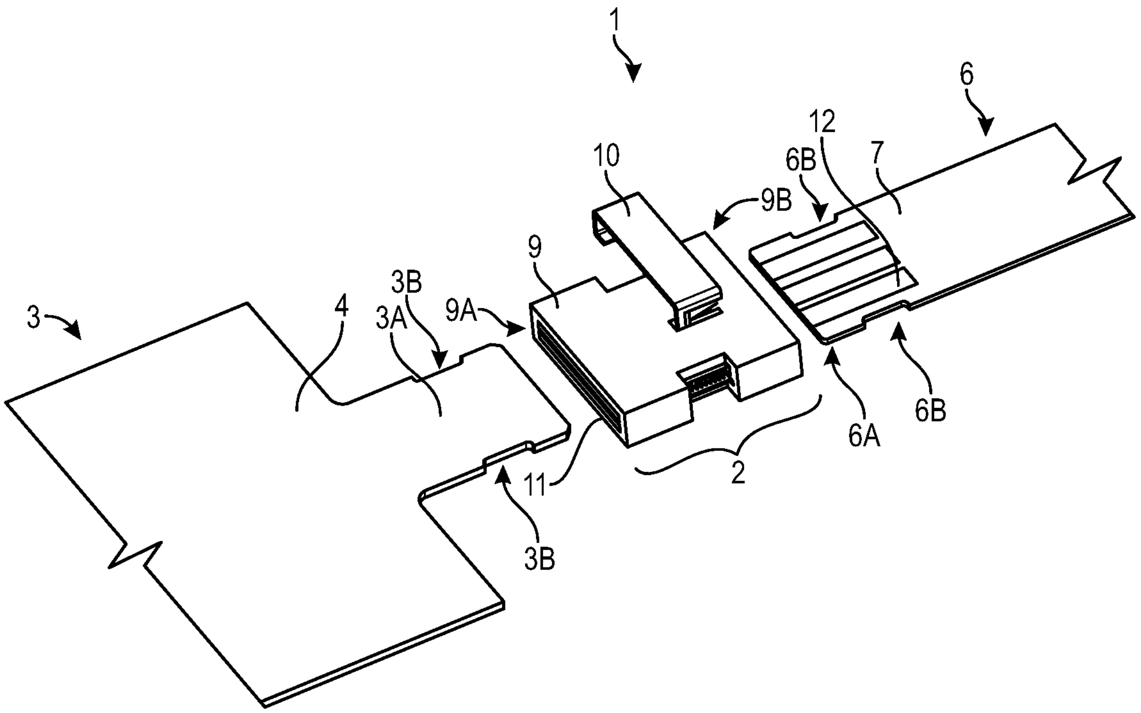
FIG. 3 is an exploded perspective view of the interconnection assembly of FIG. 1 including the electrical connector in embodiments of the present invention.
Figure 4:
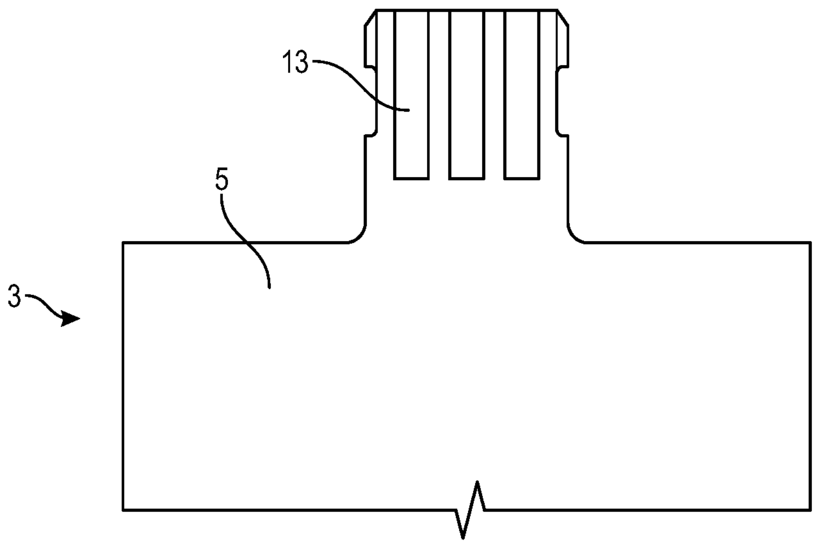
FIG. 4 illustrates a portion of an FPC with interconnection terminals formed thereon in some examples.
Figure 5:
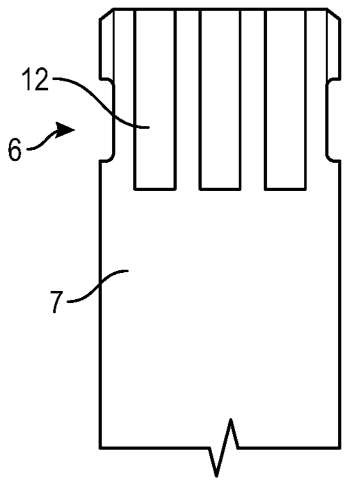
FIG. 5 illustrates a portion of an FPC with interconnection terminals formed thereon in some examples.

In embodiments of the present invention, the single piece electrical connector is applied to interconnect two flexible printed circuits to form an interconnection assembly. In the following description, the interconnection assembly including the electrical connector is first described and then the construction of the electrical connector will be described. In particular, the interconnection assembly including the electrical connector of the present invention will be described with reference to FIGS. 1 to 5. FIG. 1 is a cross-sectional view of an interconnection assembly using the electrical connector of the present invention for interconnecting two flexible printed circuits in a stacked configuration in some embodiments. FIG. 2 is a top view of a portion of the interconnection assembly of FIG. 1 in some embodiments. FIG. 3 is an exploded perspective view of the interconnection assembly of FIG. 1 including the electrical connector in embodiments of the present invention. FIG. 4 illustrates a portion of an FPC with interconnection terminals formed thereon in some examples. FIG. 5 illustrates a portion of an FPC with interconnection terminals formed thereon in some examples.

Referring to FIGS. 1-5, in an interconnection assembly 1, an electrical connector 2 is applied to interconnect a first flexible printed circuit (FPC) 3 and a second flexible printed circuit (FPC) 6. The electrical connector 2 has a housing 9 into which the first FPC 3 and the second FPC 6 are inserted to form the interconnection assembly. In the present embodiment, the electrical connector 2 includes a clip 10 for retaining the FPCs in the housing 9 and to maintain the compression for forming a low resistance electrical interconnection between the two FPCs, as will be explained in more details below.

The first FPC 3 has a first surface 4 and an opposing second surface 5. The second FPC 6 has a first surface 7 and an opposing second surface 8. In typical flexible printed circuits, interconnection terminals are provided on one of the surfaces of the FPC. In the present example, the first FPC 3 has interconnection terminals 13 (FIG. 4) provided on the second surface 5 and the second FPC 6 has interconnection terminals 12 (FIG. 5) provided on the first surface 7. The electrical connector 2 is applied to interconnect the interconnection terminals 13 of the first FPC 3 to the interconnection terminals 12 of the second FPC 6. Referring to FIG. 3, as thus configured, the first FPC 3 is inserted into the electrical connector 2 with the interconnection terminals 13 facing downward and the second FPC 6 is inserted into the electrical connector 2 with the interconnection terminals 12 facing upward. In the present embodiment, when the first and second FPCs 3 and 6 are positioned in the electrical connector 2, the interconnection terminals 13 on the first FPC 3 faces and overlaps the interconnection terminals 12 on the second FPC 6. In the present embodiment, the electrical interconnection between the interconnection terminals 13 and 12 on the two FPCs 3 and 6 is accomplished through a single piece interconnection member 11 (FIG. 3) provided in the housing 9 of the electrical connector 2. In the present embodiment, the interconnection member 11 is positioned in the housing 9 of the electrical connector 2 in a region where the first FPC 3 overlaps with the second FPC 6.

FIGS. 1 and 2 illustrate the interconnection assembly 1 with the first FPC 3 mated to the second FPC 6 using the electrical connector 2 of the present invention. FIG. 3 illustrates an exploded view of the interconnection assembly before the first FPC 3 and the second FPC 6 are inserted into the electrical connector 2. When assembled, a retention clip 10 is applied to maintain the compression force for forming the low resistance interconnection between the two FPCs through the interconnection member 11 of the electrical connector 2.

Electrical connector 2 includes the housing 9 with the interconnection member 11 provided therein. In the present embodiment, the interconnection member 11 is a two sided, single piece, normal force connector. As will be described in more details below, the interconnection member 11 includes an array of elastic, conductive contact elements emanating above a substantially planar first surface and a second array of elastic, conductive contact elements emanating above a second, opposing surface. In the interconnection member 11, a given contact element emanating above the first surface is electrically connected to one or more respective contact elements emanating above the opposing second surface.

The electrical connector 2 is configured so that the first FPC 3 and second FPC 6 are to be inserted from opposite ends of the housing 9. An interior bearing surface within the housing 9 forces the interconnection terminals 13 on first FPC 3 downward against the contact elements provided on the first surface of the interconnection member 11. In other words, as FPC 3 is inserted into the connector housing 9, the interior bearing surface of the housing 9 compresses the at least some of the contact elements of the interconnection member 11 against the interconnection terminals 13, resulting in a low resistance electrical interconnection therebetween. On the other hand, the second FPC 6 is inserted into the opposite end of the connector housing 9, and a second internal bearing surface in the housing 9 compresses the interconnection terminals 12 on second FPC 6 upward against at least some of the contact elements provided on the second surface of the interconnection member 11, resulting in a low resistance electrical interconnection therebetween.

In embodiments of the present invention, the housing 9 applies a normal force between the conductive interconnection terminals 13 provided on the second surface 5 of the first FPC 3 and the conductive contact elements provided on the first surface of the interconnection member 11 to form the low resistance electrical interconnection. The housing 9 also applies a normal force between the conductive interconnection terminals 12 provided on the first surface 7 of the second FPC 6 and the conductive contact elements provided on the second surface of the interconnection member 11 to form the low resistance electrical interconnection. In this manner, in the interconnection assembly 1, the first FPC 3 is electrically interconnected to the second FPC 6 in a region where the two FPCs overlap and interconnect through the separable interconnection member 11. In some embodiments, the housing 9 may be an injected molded housing. The housing 9 may be made of a polymer, such as a liquid crystal polymer, or it may be a composite material, such as a liquid crystal polymer filled with glass fibers or with silica particles, or may be formed of other polymers, composites, or metals. The retention clip 10 is provided over housing 9 to maintain the electrical connections of the FPCs to the interconnection member 11. The retention clip 10 may be made of a metal, such as a spring steel or stainless steel. In one embodiment, the retention clip 10 may be made of SUS 304 stainless steel. In another embodiment, the retention clip 10 may be made of SUS 301 stainless steel.

Referring to FIG. 3, in operation, the end 3A of the first FPC 3 where the interconnection terminals 13 are provided on the opposing surface 5 is inserted into an end 9A of the connector housing 9, such that the interconnection terminals on the surface 5 of the FPC 3 slide against and form contact with the elastic spring contact elements provided on the first surface of the electrical connection member 11. Meanwhile, the end 6A of the FPC 6 where the interconnection terminals 12 are provided on the surface 7 is inserted into an end 9B of the connector housing 9, such that the interconnection terminals 12 on the surface 7 of the FPC 6 slide against and form contact with elastic spring contact elements provided on the second surface of the electrical connection member 11. Subsequent to these insertions, the retention clip 10 may be attached to the connector housing 9 to retain the FPCs 3 and 6 in their inserted positions in connector housing 9 and in electrical contact with the respective contact elements provided on the interconnection member 11.

In the present embodiment, the retention clip 10 aligns with and fastens to indentations 6B on the edges of the end 6A (now inserted) of the FPC 6, and concurrently aligns with and fastens to indentations 3B on the edges of the end 3A (now inserted) of the FPC 3. As thus configured, the retention clip 10 prevents the FPCs 3, 6 from being pulled out or from being pushed further in, and further maintains the interconnection terminals on the FPCs to be in alignment with the contact elements of the electrical connector 2. A stiffening element on the ends 3A and 6A of FPCs 3 and 6 respectively may help facilitate both insertion of the FPCs into the connector 2, and the retention of the FPCs by the retention clip 10.

Appropriate dimensions of the connector housing 9 ensure that the interconnection terminals 12 on the FPC 6 and the interconnection terminals 13 on the FPC 3 apply a normal force on the elastic spring contact elements on the interconnection member 11 within the housing 9 to achieve the desired low resistance electrical interconnection. In addition, in some embodiments, the retention clip 10 applies both a lateral force to retain the FPCs in their inserted positions via the indentations 6B and 3B, respectively, but also may apply normal force on the housing 9 which, if sufficiently compliant, may transfer that force through the FPCs and onto the elastic spring contact elements of the connector.

A salient feature of the electrical connector 2 in embodiments of the present invention is that the electrical connector 2 can be used as a “floating” connector, in that it is not required for the functionality for the connector to be mounted on a printed circuit board, or on a housing or other structural element of an electronic device. Alternately, the electrical connector 2 can be affixed as needed to the electronic device or the mother board of the electronic device for case of integration or reliability but the electrical connector can function without being affixed as such.

In some embodiments, the electrical connector 2 has a housing that forms a watertight seal. In other embodiments, the electrical connector 2 has a housing that forms a hermetic or near-hermetic seal.

In the illustration provided in FIGS. 4 and 5, each FPC 3 or 6 is shown with only the conductive interconnection members 13 or 12 formed on the respective surfaces 5 or 7. It is understood that each FPC includes additional circuits and elements (not shown) to realize the function of the FPC. For example, each FPC may include circuit traces and pads provided on one or both surfaces of the FPC, and vias interconnecting elements formed on the opposing surfaces. Each FPC may further include internal circuit layers. For clarity reasons, the additional circuits and elements of the FPCs are not shown in FIGS. 4 and 5. In the present example, the interconnection terminals 13, 12 may be copper terminals, and may have a corrosion resistant surface finish such as plated gold, plated gold over plated nickel, plated silver, or other surface finish with low electrical resistance and which are suitable for forming low resistance electrical interconnections to contact elements in an electrical connector. In the present example, each of the FPCs 3 and 6 shown in FIGS. 4 and 5 has 3 interconnection terminals. The configuration is illustrative only and not intended to be limiting. It is understood that other quantities of interconnection terminals can be provided on the FPCs and the electrical connector of the present invention can be configured to form interconnection between FPCs with any number of interconnection terminals.

Figure 6A:
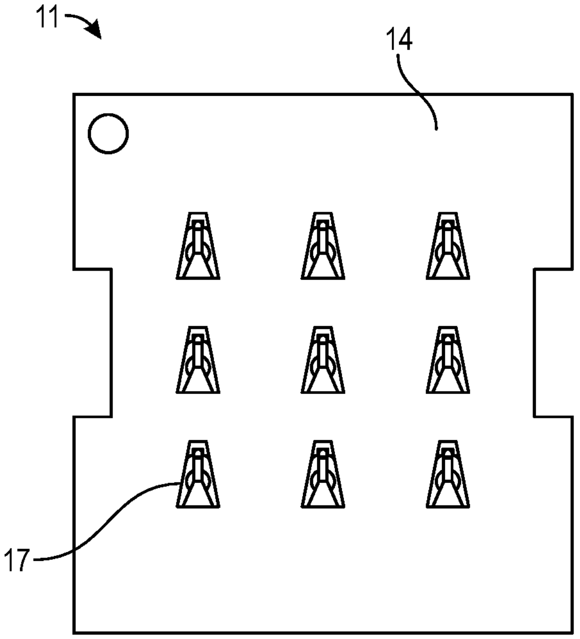
FIGS. 6A, 6B and 6C illustrate the construction of the interconnection member provided in the housing of the electrical connector of FIGS. 1, 2, and 3 in some embodiments.
Figure 6B:
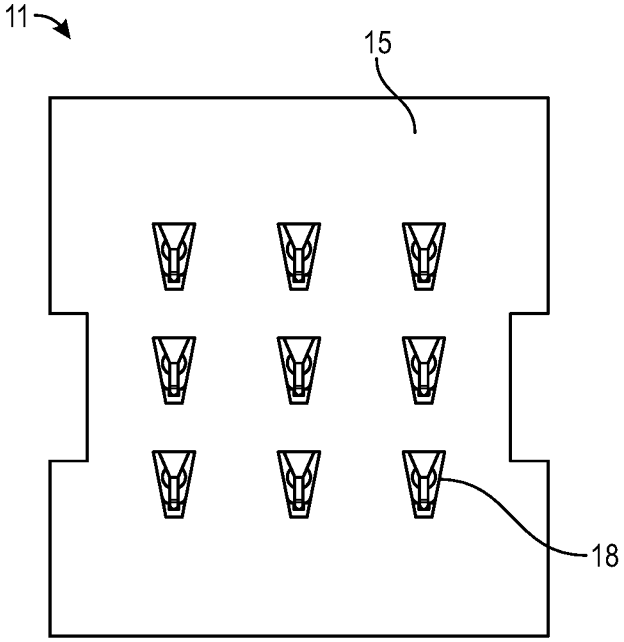
Figure 6C:
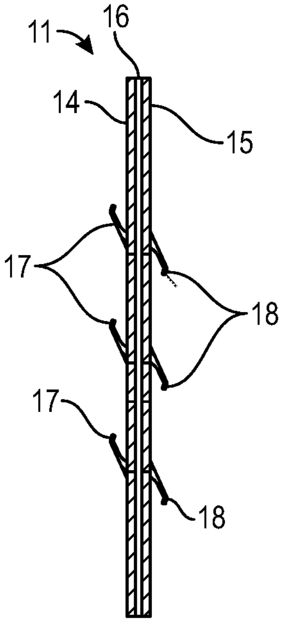

FIGS. 6A, 6B and 6C illustrate the construction of the interconnection member provided in the housing of the electrical connector of FIGS. 1, 2, and 3 in some embodiments. FIGS. 6A and 6B respectively show a drawing of a top view and a bottom view of the interconnection member and FIG. 6C shows a drawing of a cross-sectional view of the interconnection member. Referring to FIGS. 6A to 6C, the interconnection member 11 in the electrical connector 2 includes a first surface 14 (FIG. 6A) and an opposing second surface 15 (FIG. 6B). The interconnection member 11 includes an array of electrically conductive and elastic spring contact elements 17 (hereinafter referred to as “contact elements 17”) emanating above the surface 14. In the present embodiment, the contact elements 17 are arranged in a 3 by 3 array, for a total of 9 contact elements. The interconnection member 11 further includes an array of electrically conductive and elastic spring contact elements 18 (hereinafter referred to as “contact elements 18”) emanating above the surface 15. In the present embodiment, the contact elements 18 are arranged in the same 3 by 3 array matching the array of contact elements 17. It is understood that the interconnection member 11 can be provided with any number of contact elements 17 arranged in appropriate patterns for mating with circuit elements as needed.

As thus configured, at least one of the contact elements 17 on the first surface 14 of the interconnection member 11 is electrically connected to at least one of the contact elements 18 on the second surface 15 of the interconnection member 11. In practice, each contact element 17 provided on the first surface 14 is electrically connected to at least one corresponding contact element 18 provided on the second surface 15 of the interconnection member 11. In another example, two or more contact elements 17 on the first surface 14 of the interconnection member 11 are electrically connected to each other and to two or more contact elements 18 on the second surface 15 of interconnection member 11. Through the side to side interconnection using the contact elements of the interconnection member 11, the electrical connector of the present invention enables the interconnection of two circuit elements.

In embodiments of the present invention, the contact elements 17 and 18 are formed as compliant spring contact elements. In some embodiments, the contact elements are cantilever beam-like elastic conductive contact elements. In the present embodiment, each contact element is formed as metal flanges extending from a base portion. Furthermore, in some embodiments, each contact element, when engaged, provides substantial wipe to remove resistive contaminants that may be present on the surfaces to be contacted. In other embodiments, other types of contact elements can be used depending on the components to which the connector is to be connected. The contact elements used for the interconnection member in the connector is selected based on the type of contact structures of the circuit elements to which the connector is to be coupled. In one embodiment, the elastic spring contact elements are formed of a copper alloy such as copper-beryllium or copper-nickel-tin.

In some embodiment, the contact elements provided on the surfaces of the interconnection member 11 are aligned with the interconnection terminals of the circuit elements to facility mating of the circuit element to the electrical connector. In one embodiment, a set of one or more contact elements is configured to align to one finger of the interconnection terminals of the circuit element. For example, in FIGS. 6A and 6B, the 3×3 array of contact elements is provided to connect to the three fingers of the interconnection terminals of the FPCs of FIGS. 4 and 5. Accordingly, each column of three contact elements is aligned with one finger of the interconnection terminals of the FPCs in FIGS. 4 and 5.

Referring to the cross-sectional view in FIG. 6C, the interconnection member 11 includes a body 16 having the first surface 14 with contact elements 17 protruding therefrom and the second surface 15 with contact elements 18 protruding therefrom. In some embodiments, the body 16 is formed from printed circuit board laminate materials, such as an epoxy/woven glass material commonly knows as FR4. In another embodiment, the body 16 is a molded polymer or composite, such as liquid crystal polymer (LCP) or LCP filled with chopped glass fibers. In some embodiments, a contact element 17 is connected to a contact element 18 through the body 16 by means of a plated via, a plated through hole or a plated blind via (not shown in FIG. 6C).

In embodiments of the present invention, the contact elements 17 and 18 are cantilever beam-like contact elements, with a proximal end attached to the body 16 and a distal end emanating above surfaces 14 and 15, respectively. In the present example as shown in FIG. 6C, the contact elements 17 provided the first surface 14 are oriented in an opposing direction to the contact elements 18 provided on the second surface 15 of interconnection member 11. In one embodiment, contact elements 18 are oriented 180 degrees from contact elements 17, such that a vector drawn from the proximal end to the distal end of any individual contact element 17 is oriented 180 degrees to a vector drawn from the proximal end to the distal end of any individual contact element 18. In addition, each of the array of contact elements 17 are oriented in the same direction, while each of the array of contact elements 18 are oriented in a direction which is 180 degrees from the direction of the contact elements 17. In embodiments of the present invention, the 180 degrees offset orientation facilitates insertion of an FPC into opposing ends of the electrical connector, by enabling the interconnection terminals on the end of the FPC to be inserted from the proximal end or the "base" of the cantilever beam-like spring contact element, and travel toward the proximal end of the contact element during insertion. In this manner, the FPC interconnection terminals cannot snag the suspended, proximal "tip" of the contact element and cause damage to the contact elements. Hence, using the example of the interconnection member 11 shown in FIG. 6C, an FPC intended to form an electrical interconnection to contact elements 17 on the first surface 14 of body 16 would be inserted from the direction of the bottom of the page in a direction toward the top of the page, whereas an FPC intended to form an electrical interconnection to contact elements 18 on the second surface 15 of body 16 would be inserted from the direction of the top of the page in a direction toward the bottom of the page.

In the example shown in FIGS. 6A, 6B and 6C, the interconnection member 11 includes 9 elastic, conductive contact elements per side. Meanwhile, in the present example, the two FPCs that are being interconnected electrically to one another have three interconnection terminals (or fingers) each, as shown in FIGS. 4 and 5. These interconnection terminals are elongated and designed such that 3 elastic, conductive contact elements from one surface of the interconnection member 11 interconnect with each interconnection terminal (or finger). In this manner, the interconnection member 11 forms a redundant interconnection for high reliability, high current carrying capacity, and very low electrical resistance. In another embodiment of the present invention, only one elastic, conductive spring contact element may be provided to electrically mate with each interconnection terminal of the FPC. In a further embodiment of the present invention, two clastic contact elements may be provided to mate with each interconnection terminal of the FPC.

In some embodiments, the contact elements of the electrical connector of the present invention are formed using the contact elements and connector structure described in U.S. Patent Publication No. US 2016/0344118. More specifically, U.S. Patent Publication No. US 2016/0344118, entitled "Separable Electrical Connector and Method of Making It" discloses a low profile connector element where the connector includes electrical contacts having a unitary structure. The unitary contact elements can be formed by a stamped or a stamped and formed process to form contact elements with a unitary structure while protruding on opposing surfaces. The '118 patent application is hereby incorporated by reference in its entirety.

In other embodiments, the contact elements of the electrical connector of the present invention are formed using the contact elements and connector structure described in the following U.S. patents: (1) U.S. Pat. No. 7,371,073, entitled "Contact Grid Array", issued May 13, 2008; (2) U.S. Pat. No. 7,056,131, entitled "Contact Grid Array System", issued Jun. 6, 2006; and (3) United States U.S. Pat. No. 7,758,351, entitled "Method and System for Batch Forming of Spring Elements", issued Jul. 20, 2010. The disclosures of the aforementioned U.S. patents are incorporated by reference in their entireties.

Figure 7:
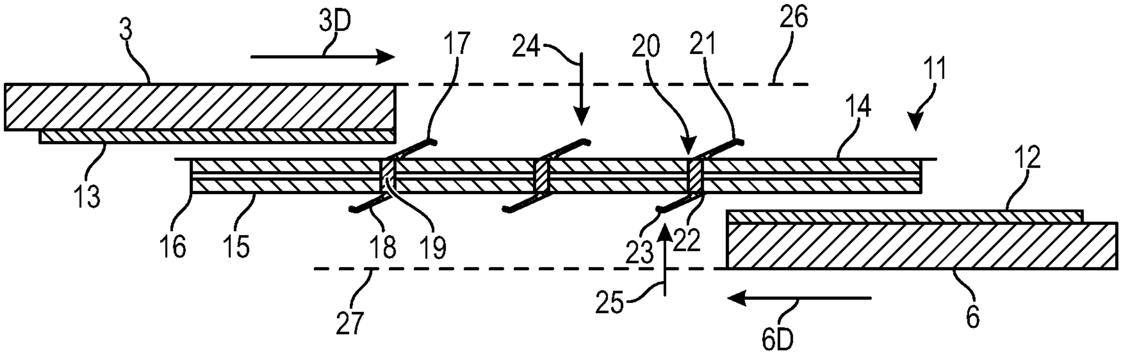
FIG. 7 is a cross-sectional view of the electrical connector of FIGS. 1-3 with the housing removed to illustrate with more clarity the interconnection member interfacing with the first and second FPCs in embodiments of the present invention.

FIG. 7 is a cross-sectional view of the electrical connector of FIGS. 1-3 with the housing removed to illustrate with more clarity the interconnection member interfacing with the first and second FPCs in embodiments of the present invention. Referring to FIG. 7, the interconnection member 11 in the housing of the electrical connector has a first surface 14 from which emanate an array of cantilever beam-like conductive spring contact elements 17 (also referred to as "contact elements 17"). Each contact element 17 has a proximal end 20 and a distal end 21. The proximal end 20 of the contact element 17 is attached to or embedded below the first surface 14. Meanwhile, the distal end 21 of the contact element 17 emanates above the first surface 14. Contact elements 17 on the first surface 14 are all oriented in substantially the same direction. Compressing contact elements 17 in a direction normal to the first surface 14 of the interconnection member 11 requires a normal force whose magnitude is proportional to the spring constant of the contact elements 17, and which is designed to be great enough to provide a low electrical resistance interconnection between contact elements 17 and the interconnection terminals 13 on the FPC 3 to be mated.

Furthermore, the interconnection member 11 has a second surface 15 from which emanate an array of cantilever beam-like conductive spring contact elements 18. Each contact element 18 has a proximal end 22 and a distal end 23. The proximal end 22 of the contact element 18 is attached to or embedded below the second surface 15. Meanwhile, the distal end 23 of the contact element 18 emanates above the second surface 15. Compressing contact elements 18 in a direction normal to the second surface 15 of the interconnection member 11 requires a normal force whose magnitude is proportional to the spring constant of the spring contact elements 18, and which is designed to be great enough to provide a low electrical resistance interconnection between contact elements 18 and the interconnection terminals 12 on the FPC 6 to be mated. Contact elements 18 on the second surface 15 are all oriented in substantially the same direction with one another, in that the distal ends 23 of contact elements 18 are oriented on the left side of the proximal ends 22 of contact elements 18 as shown in FIG. 7. Furthermore, contact elements 18 are oriented in a substantially opposing direction from contact elements 17, whose distal ends 21 are oriented on the right side of proximal ends 20, and as such contact elements 17 and contact elements 18 are oriented approximately 180 degrees from each other.

In interconnection member 11, at least one of the contact elements 17 on the first surface 14 is electrically connected to at least one of the contact elements 18 on the second surface 15. In the present embodiment shown in FIG. 7, the connection of the contact elements 17 and 18 is accomplished by conductive vias 19, which traverses the body 16 of the interconnection member 11 from the first surface 14 to the second surface 15. The conductive via 19 may be a plated via, a via filled with a conductive material such as a solder or a conductive paste, or other conductive via or other means forming a side to side electrical connection through a planar substrate.

In the example shown in FIG. 7, the first FPC 3, with the interconnection terminals 13 formed thereon, is to be interconnected to the second FPC 6, with the interconnection terminals 12 formed thereon, using the interconnection member 11. The location of inner bearing surfaces of the housing of the electrical connector are denoted by the dash lines 26 (upper) and 27 (lower).

The first FPC 3 is inserted into the housing of the electrical connector between the inner bearing surface 26 and the first surface 14 of the interconnection member 11, in a direction 3D generally from left to right as shown in FIG. 7. The bearing surface 26 forces the interconnection terminals 13 to make robust contact with and compress downward in a direction 24 toward the contact elements 17 on the first surface. The compressive force is applied from the proximal end 20 of the contact elements 17 toward the distal end 21. In this manner, the interconnection terminals 13 can slide across contact elements 17 without snagging the distal end 21 (or the tip) of the contact elements 17.

Similarly, the second FPC 6 is inserted into the housing of the electrical connector between the inner bearing surface 27 and the second surface 15 of the internal interconnection member 11, in a direction 6D generally from right to left as shown in FIG. 7. The bearing surface 27 forces the interconnection terminals 12 to make robust contact with and compress downward in a direction 25 toward the contact elements 18 on the second surface 15. The compressive force is applied from the proximal end 22 of the contact elements 18 toward the distal end 23. In this manner, the interconnection terminals 12 can slide across contact elements 18 without snagging the distal end 23 (or the tip) of the contact elements 18.

In the present example, the orientation of contact elements 17 relative to contact elements 18 of 180 degrees enables the two FPCs which are being interconnected to be inserted from opposite sides of the electrical connector, without damaging the spring contact elements during insertion.

In the embodiment shown in FIG. 7, each interconnection terminal 13 on the FPC 3 is long enough that when fully inserted, each interconnection terminal 13 may interface with multiple contact elements 17 on the interconnection member 11. This redundant interconnection may be beneficial in improving the reliability of an electrical interconnection, as well as in reducing the electrical resistance of the interconnection and improving current carrying capacity. In other embodiments of the present invention, each interconnection terminal on an FPC would interface with and make an electrical interconnection to only one elastic spring contact element each. Other levels of redundancy, such as two spring contact elements interfacing with each FPC interconnection terminal may be used in other embodiments.

Figure 8A:
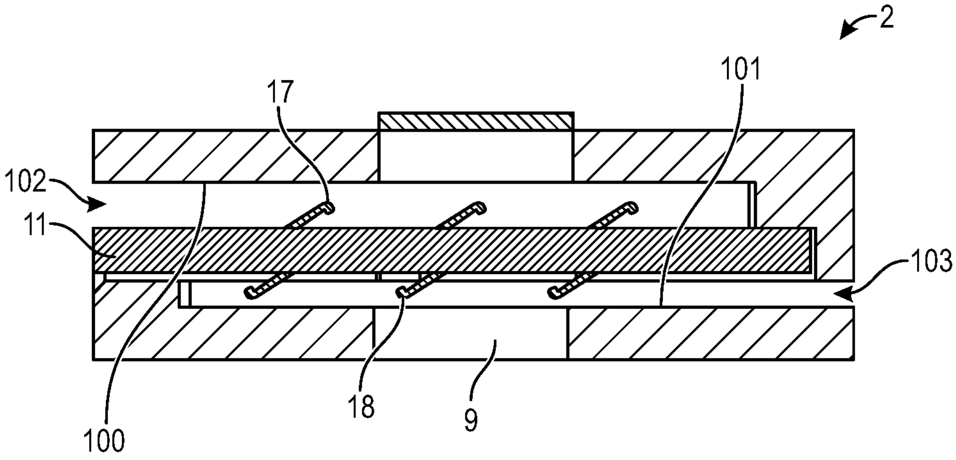
FIG. 8A is a cross-sectional view of an electrical connector for mating two circuit elements in a stacked configuration in embodiments of the present invention.
Figure 8B:
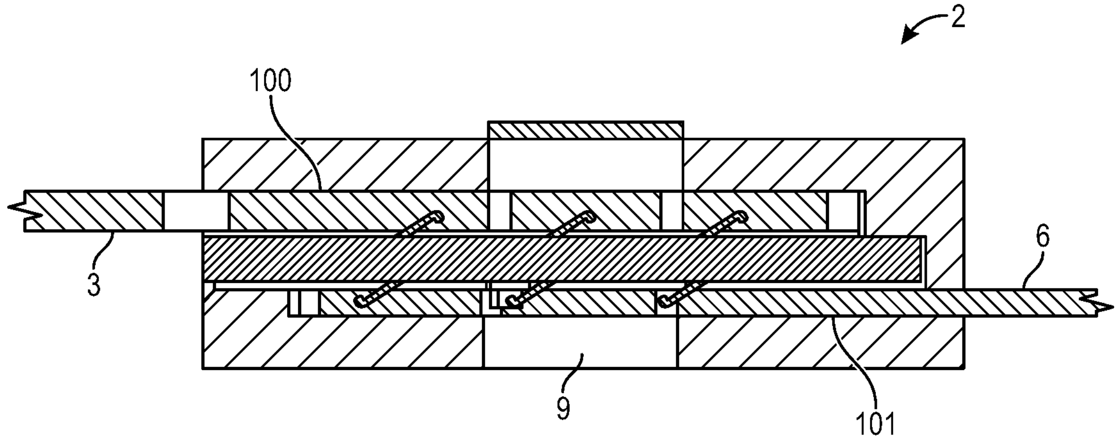
FIG. 8B illustrates the electrical connector of FIG. 8A with two circuit elements inserted in some examples.

FIG. 8A is a cross-sectional view of an electrical connector for mating two circuit elements in a stacked configuration in embodiments of the present invention. FIG. 8B illustrates the electrical connector of FIG. 8A with two circuit elements inserted in some examples. Referring to FIG. 8A, an electrical connector 2 is formed in a housing 9 which includes insertion slots 102 and 103 for receiving a pair of circuit elements for mating or interconnecting. The electrical connector 2 has formed therein an interconnection member 11 with contact elements 17 and 18 formed thereon as compliant spring contact elements and emanating from the two opposing surfaces of the member 11. As described above, the contact elements 17 protruding in the insertion slot 102 are all facing in the same direction with the distal ends of the contact elements 17 pointing away from the opening of the insertion slot 102. Meanwhile, the contact elements 18 protruding in the insertion slot 103 are all facing in the same direction and 180 degrees from the orientation of the contact elements 17. The distal ends of the contact elements 18 point away from the opening of the insertion slot 103. The housing 9 includes a bearing surface 100 associated with the insertion slot 102 and a bearing surface 101 associated with the insertion slot 103.

Referring to FIG. 8B, a first FPC 3 is inserted into the insertion slot 102 and a second FPC 6 is inserted into the insertion slot 103. The bearing surface 100 above the insertion slot 102 of the connector housing 9 forces the FPC 3 downward against the contact elements 17 of the interconnection member 11, compressing the contact elements 17 and forming a low resistance electrical connection between the interconnection terminals on the FPC 3 and the contact elements 17. The bearing surface 101 below the insertion slot 103 of the connector housing 9 forces the FPC 6 upward against the contact elements 18 of the interconnection member 11, compressing the contact elements 18 and forming a low resistance electrical interconnection between the interconnection terminals on the FPC 6 and the contact elements 18. At least one of the contact elements 17 on the interconnection member 11 is electrically interconnected to at least one of the contact elements 18 on the interconnection member 11, thereby forming an electrical interconnection between the FPC 3 and the FPC 6.

In the above-described embodiments, the electrical connector is configured to interconnect two circuit elements in a stacked configuration where the two circuit elements are inserted into the housing of the electrical connector to overlap each other and an interconnection member is provided in the overlap region to interconnect the interconnection terminals of the two circuit elements. In the stacked configuration, the interconnection member includes contact elements emanating from two opposing surfaces of the member to make the electrical connections to the circuit elements disposed on the two opposing surfaces. In alternate embodiments of the present invention, an electrical connector is configured to interconnect two circuit elements in a coplanar configuration where the two circuit elements are inserted into the housing of the electrical connector in a side-by-side arrangement and an interconnection member is provided to overlap the interconnection terminals of the two circuit elements to form the electrical interconnection therebetween. In the present description, the electrical connector described above with reference to FIGS. 1-3, 6A to 6C, 7 and 8A to 8B will sometimes be referred to as a "vertical stacked electrical connector". Meanwhile, the electrical connector for interconnecting two circuit elements in a coplanar configuration will sometimes be referred to as a "coplanar electrical connector" in the following description.

Figure 9A:
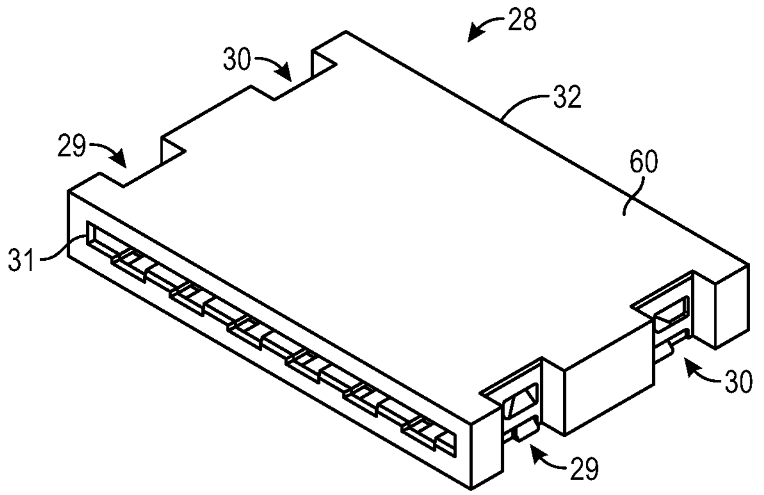
FIG. 9A is a perspective view of an electrical connector configured for coplanar interconnection in alternate embodiments of the present invention.
Figure 9B:
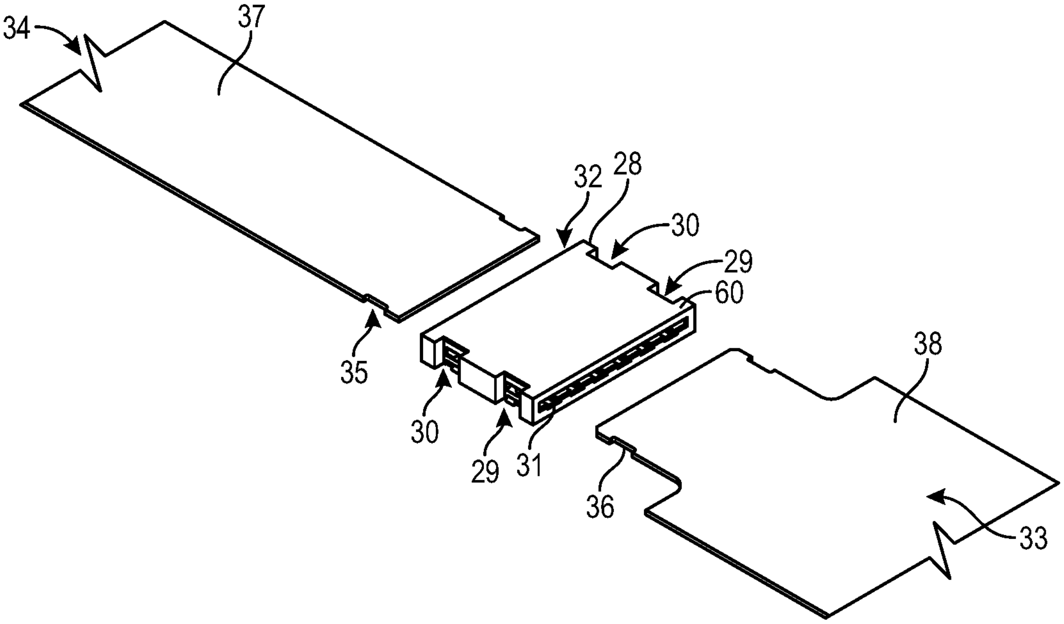
FIG. 9B is an exploded perspective top view of an interconnection assembly including the electrical connector of FIG. 9A connecting two circuit elements in some embodiments.
Figure 10:
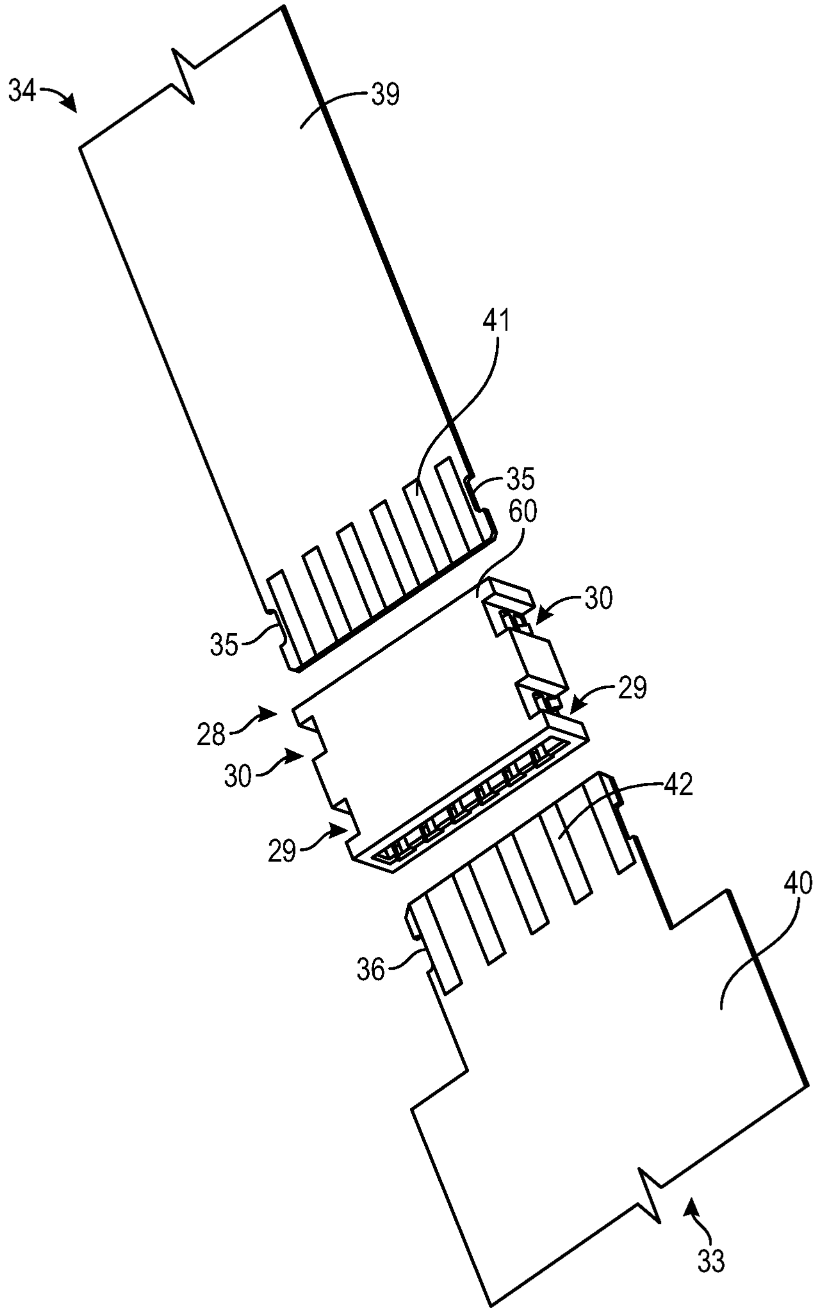
FIG. 10 is an exploded perspective bottom view of the interconnection assembly of FIG. 9B in some embodiments.

FIG. 9A is a perspective view of an electrical connector configured for coplanar interconnection in alternate embodiments of the present invention. FIG. 9B is an exploded perspective top view of an interconnection assembly including the electrical connector of FIG. 9A connecting two circuit elements in some embodiments. FIG. 10 is an exploded perspective bottom view of the interconnection assembly of FIG. 9B in some embodiments. Referring first to FIG. 9A, an electrical connector 28 has a housing 60 including a first insertion slot 31 and a second insertion slot formed on opposing sidewalls of the housing. The housing 60 further includes a detent pair 29 and a detent pair 30. Each detent pair 29, 30 matches corresponding detent pairs formed on the circuit elements to be mated. Detent pairs 29, 30 are also provided to receive one or more retention clips (not shown) to maintain the connection of the circuit elements in the electrical connector 28. The retention clips can be implemented in the same manner as the retention clip 10 described above with reference to FIGS. 1-3. The electrical connector 28 further includes an interconnection member (not shown in FIG. 9A) with contact elements formed thereon to provide the interconnection between circuit elements inserted into the insertion slots.

Referring to FIGS. 9B and 10, in the present example, the electrical connector 28 is provided for interconnecting two FPCs 33 and 34. Each of the PFCs 33, 34 includes interconnection terminals 42, 41 provided on a respective first surface 40, 39. In the present embodiment, the FPCs 33 and 34 are inserted into the electrical connector 28 facing downward, as shown in the perspective top view in FIG. 9B. The interconnection terminals of the FPCs 33, 34 are not shown in FIG. 9B as the FPCs are inserted with the second surfaces 38 and 37 facing upward in the top view, but the interconnection terminals 42, 41 are visible in the perspective bottom view of FIG. 10. In operation, the FPCs 33 and 34 are inserted approximately halfway into the electrical connector 28, such that their ends abut but do not overlap. Electrical connector 28 includes detent pair 29 which correspond to detents 36 formed in the end of the FPC 33. Electrical connector 29 includes detent pair 30 which correspond to detents 35 formed in the end of the FPC 34. In the present embodiment, each detent pair 29, 30 is configured to accommodate a retention clip to retain the inserted FPC in the respective insertion slot. With the FPCs 33, 34 inserted into the electrical connector 28, at least one of the interconnection terminals 41 of the FPC 34 is electrically interconnected to at least one of the interconnection terminals 42 through the electrical connector 28.

Figure 11A:
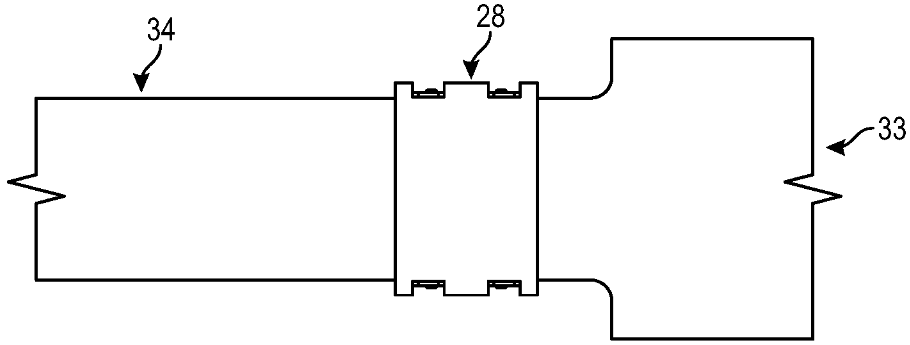
FIG. 11A is a top view of the interconnection assembly of FIGS. 9B and 10 including the electrical connector of FIG. 9A with inserted circuit elements in some embodiments.
Figure 11B:
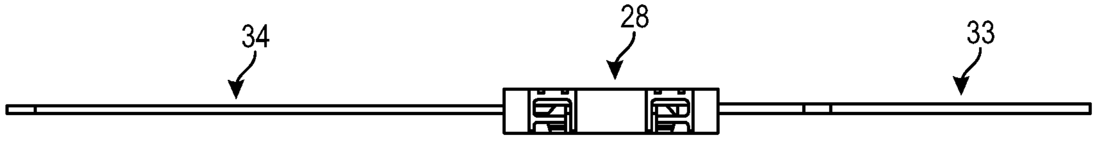
FIG. 11B is a cross-sectional view of the interconnection assembly of FIG. 11A including the electrical connector of FIG. 9A with inserted circuit elements in some embodiments.

FIG. 11A is a top view of the interconnection assembly of FIGS. 9B and 10 including the electrical connector of FIG. 9A with inserted circuit elements in some embodiments. FIG. 11B is a cross-sectional view of the interconnection assembly of FIG. 11A including the electrical connector of FIG. 9A with inserted circuit elements in some embodiments. In particular, FIG. 11A illustrates the interconnection assembly of the electrical connector 28 with the FPCs 33 and 34 inserted therein for interconnection. The cross-sectional view of FIG. 11B shows that the FPCs 33 and 34 are inserted into the electrical connector 28 in a substantially coplanar arrangement, without overlapping of the FPCs inside the electrical connector 28.

Figure 12:
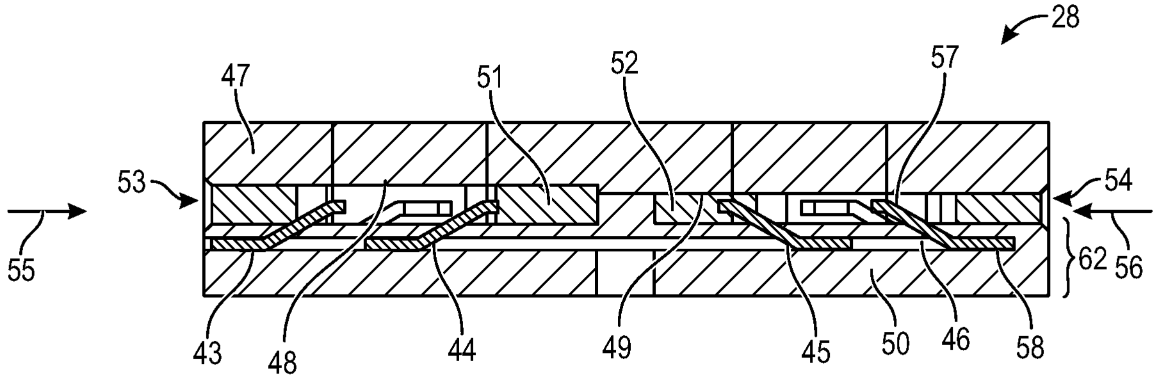
FIG. 12 is a cross-sectional view of a coplanar electrical connector in embodiments of the present invention.

FIG. 12 is a cross-sectional view of a coplanar electrical connector in embodiments of the present invention. Referring to FIG. 12, an electrical connector 28 includes a housing with an interconnection member 62 having an array of clastic spring contact elements formed thereon and emanating above a surface of the interconnection member 62. In the present embodiment, the array of contact elements includes a first group of contact elements 43, 44 provided on the left side of the electrical connector 28 as drawn in FIG. 12 where the contact elements 43, 44 emanate upward in a left to right direction. That is, the contact elements 43, 44 have proximal ends attached to member 62 and distal ends pointing away from the insertion slot 53 to which a circuit element is to be inserted. The array of contact elements includes a second group of contact elements 45, 46 provided on the right side of the electrical connector 28 as drawn in FIG. 12 where the contact elements 45, 46 emanate upward in a right to left direction. That is, the contact elements 45, 46 have proximal ends attached to member 62 and distal ends pointing away from the insertion slot 54 to which a circuit element is to be inserted.

As thus configured, the first group of contact elements 43, 44 are provided to connect to an FPC that is inserted from the insertion slot 53 in a direction 55 and the second group of contact elements 45, 46 are provided to connect to an FPC that is inserted from the insertion slot 54 in a direction 56. At least one contact element in the first group is electrically connected to at least one contact element in the second group. In this manner, an FPC inserted into the slot 53 is interconnected to an FPC inserted into the slot 54 through the interconnection member 62.

The housing of the electrical connector 28 includes an upper body region 47 and a lower body region 50. The upper body region 47 forms internal planar bearing surfaces 48 and 49. The lower body region 50 includes the interconnection member 62 with associated elastic spring contact elements (e.g. contact elements 43, 44, 45, 46) formed thereon. The electrical connector 28 includes insertion hard stops 51, 52 to limit the insertion distance of the FPCs to be interconnected. As thus configured, an FPC inserted into the slot 53 of electrical connector 28 is forced downward against the contact elements 43 and 44 by the bearing surface 48, whereby the insertion distance is limited by the hard stop 51. A mating FPC into the slot 54 of electrical connector 28 is forced downward against the contact elements 45 and 46 by the bearing surface 49, whereby the insertion distance is limited by the hard stop 52.

In some embodiments, the elastic spring contact elements are cantilever-beam like springs, and are oriented generally parallel to the direction of insertion of the FPCs, such that the interconnection terminals on the FPC slide from the proximal ends of the contact elements (e.g. proximal end 58 for contact element 46) toward the distal ends of the contact elements (e.g. distal end 57 for contact element 46). In this manner, insertion of the FPCs into the insertion slots of the electrical connector 28 minimizes the risk of insertion difficulties or damage to the FPC or to the elastic spring contact elements of the electrical connector. In the present embodiment, the elastic spring contact elements on opposite ends of the electrical connector 28 are oriented in a direction 180 degrees from each other to accommodate the opposing insertion directions 55 and 56 for the FPCs being interconnected. The height of the bearing surface 48 above the contact elements 43 and 44 and the height of the bearing surface 49 above the contact elements 45 and 46 are designed to enable full working range compression of these contact elements against the FPC interconnection terminals, taking into account the thickness of the FPC including any stiffeners or other support structures on the FPC ends.

In embodiments of the present invention, the interconnection member 62 of the electrical connector 28 includes a body formed from printed circuit board laminate materials, molded polymer or composites or other suitable materials. The cantilever-like elastic spring contact elements of member 62 can be formed in the manner as described above with reference to the electrical connector 2. In the present embodiment, the interconnection member 62 includes conductive traces formed in or on the body to connect at least one of the contact elements in the first group to at least one of the contact elements in the second group. In particular, the conductive traces extend laterally from one end of the member 62 to the other end of the member 62 to connect respective contact elements formed in the two groups.

Figure 13A:
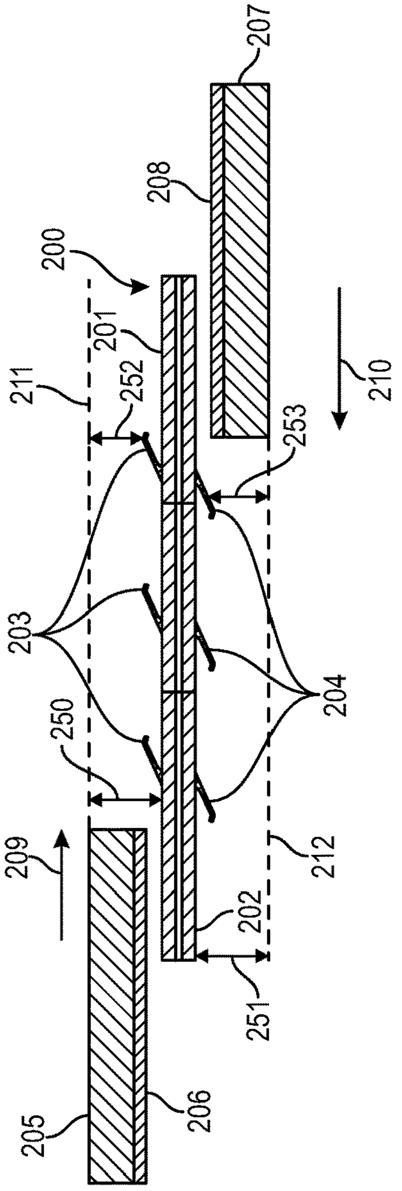
FIG. 13A is a cross-sectional view illustrating the interconnection member of a stacked electrical connector interconnecting two circuit elements in some embodiments.
Figure 13B:
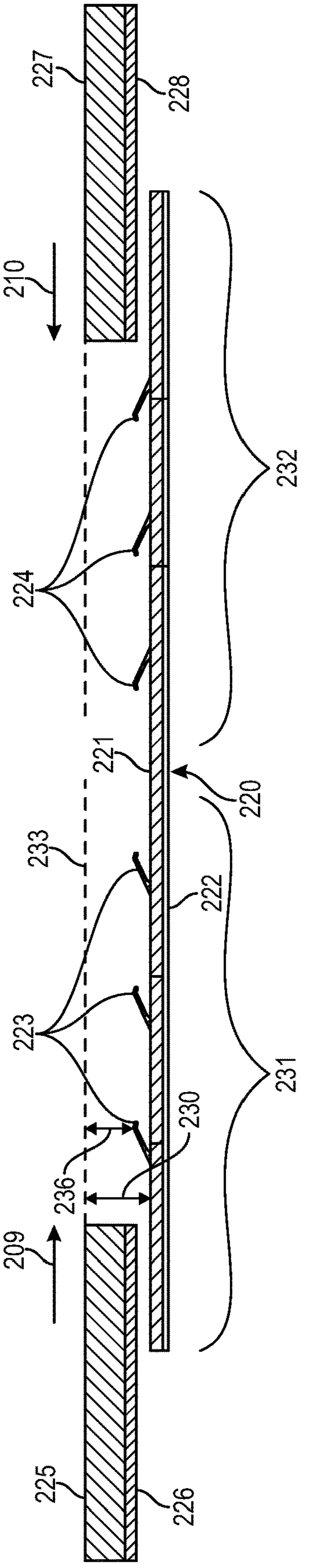
FIG. 13B is a cross-sectional view illustrating the interconnection member of a coplanar electrical connector interconnecting two circuit elements in some embodiments.

FIG. 13A is a cross-sectional view illustrating the interconnection member of a stacked electrical connector interconnecting two circuit elements in some embodiments. FIG. 13B is a cross-sectional view illustrating the interconnection member of a coplanar electrical connector interconnecting two circuit elements in some embodiments. Referring first to FIG. 13A, a stacked electrical connector includes an interconnection member 200 with conductive spring contact elements 203 and 204 formed on and emanating from opposing surfaces 201 and 202. At least one of the conductive spring contact elements 203 is connected electrically to at least one of the conductive spring contact elements 204. The contact element connection may be achieved by a conductive via, by a trace, by a conductive strip such as stamped and formed metal, or by other means. The housing of the stacked electrical connector is omitted in FIG. 13A to illustrate the internal components of the connector. The housing of the electrical connector forms an internal bearing surface 211 located a controlled distance 250 above the surface 201 of the interconnection member 200, where the location of the bearing surface 211 is represented by a dashed line labeled 211 in FIG. 13A. The housing of the electrical connector further forms an internal bearing surface 212 located a controlled distance 251 above the surface 202 of interconnection member 200, where the location of the bearing surface 212 is represented by a dashed line labeled 212 in FIG. 13A.

The bearing surface 211 applies a normal force to a circuit element, such as FPC 205, inserted into the housing of the electrical connector to be electrically connected to the interconnection member 200. The bearing surface 212 applies a normal force to a circuit element, such as FPC 207, inserted into the housing of the electrical connector to be electrically connected to the interconnection member 200. The FPC 205 and the FPC 207 are inserted into the electrical connector at opposite ends with their respective interconnection terminals 206, 208 facing the interconnection member 200. In some embodiments, the bearing surface 211 is designed to be a distance 252 from the top of the conductive spring contact elements 203 in their uncompressed state. The distance 252 can be less than the thickness of the FPC 205 inclusive of the interconnection terminals 206 and any other associated structures on the FPC 205, such as a stiffener, but greater than or equal to the thickness of the FPC 205 plus the elastic working range of contact elements 203. Similarly, the bearing surface 212 is designed to be a distance 253 from the top of the conductive spring contact elements 204 in their uncompressed state. The distance 253 can be less than the thickness of the FPC 207 inclusive of the interconnection terminals 208 and any other associated structures on the FPC 207, such as a stiffener, but greater than or equal to the thickness of the FPC 207 plus the elastic working range of contact elements 204. In this manner, insertion of the FPC 205 in a direction 209 into the electrical connector, or insertion of the FPC 207 in a direction 210 into the electrical connector, causes the interconnection terminals 206, 208 to contact and compress contact elements 203, 204 in order to form a low resistance, reliable electrical interconnection, but does not over compress the contact elements such that they may be plastically deformed.

With the FPCs 205 and 207 inserted and connected to the interconnection member 200, the interconnection terminals 206 on the FPC 205 is electrically interconnected to the interconnection terminals 208 on the FPC 207 through the interconnection member 200. More specifically, the FPCs 205 and 207 are interconnected by one or more elastic spring contact elements 203 and 204 formed on the interconnection member 200 where conductive vias or other internal connections connect one or more contact elements 203 to one or more contact elements 204. In the stacked electrical connector illustrated in FIG. 13A, the two circuit elements (the FPC 205 and the FPC 207) are inserted from opposite direction sand arranged stacked on top of each other with an overlapping region over the interconnection member 200.

Referring now to FIG. 13B, a coplanar electrical connector includes an interconnection member 220 with conductive spring contact elements 223 and 224 formed on and emanating from the same surface 221. The contact elements of the interconnection member 220 are divided into two groups: a first group of contact elements 223 provided on a first side 231 of the interconnection member 220 and a second group of contact elements 224 provided on a second side 232 of the interconnection member 220. At least one of the conductive spring contact elements 223 is connected electrically to at least one of the conductive spring contact elements 224. The contact element connection may be achieved by conductive circuit traces or conductive strips, such as stamped and formed metal, formed on or in the interconnection member 220. The contact elements 223 are configured in an orientation 180 degrees from the contact elements 224 such as the distal ends of the contact elements 223 faces the distal ends of the contact elements 224. The housing of the coplanar electrical connector is omitted in FIG. 13B to illustrate the internal components of the connector. The housing of the electrical connector forms an internal bearing surface 233 located a controlled distance 230 above the surface 221 of the interconnection member 220, where the location of the bearing surface 233 is represented by a dashed line labeled 233 in FIG. 13B.

The bearing surface 233 applies a normal force to a pair of circuit elements, such as FPC 225 and 227, inserted into the housing of the coplanar electrical connector to be electrically connected to the interconnection member 220. In the present configuration, the FPC 225 and the FPC 227 are inserted into the coplanar electrical connector at opposite sides with their respective interconnection terminals 226, 228 facing the interconnection member 200. When assembled in the coplanar electrical connector, the FPC 225 and the FPC 227 are further arranged on the same plane, without any overlapping region. In some embodiments, the bearing surface 233 is designed to be a distance 236 from the top of the conductive spring contact elements 223, 224 in their uncompressed state. The distance 236 can be less than the thickness of the FPC 225, 227 inclusive of the interconnection terminals 226, 228 and any other associated structures on the FPC 225, 227 such as a stiffener, but greater than or equal to the thickness of the FPC 225, 227 plus the elastic working range of contact elements 223, 224. In this manner, insertion of the FPC 225 in a direction 209 into the electrical connector causes the interconnection terminal 226 to contact and compress contact elements 223 in order to form a low resistance, reliable electrical interconnection, but does not over compress the contact elements such that they may be plastically deformed. Similarly, insertion of the FPC 227 in a direction 210 into the electrical connector causes the interconnection terminal 228 to contact and compress contact elements 224 in order to form a low resistance, reliable electrical interconnection, but does not over compress the contact elements such that they may be plastically deformed.

With the FPCs 225 and 227 inserted and connected to the interconnection member 220, the interconnection terminals 226 on the FPC 225 is electrically interconnected to the interconnection terminals 228 on the FPC 227 through the interconnection member 220. More specifically, the FPCs 225 and 227 are interconnected by one or more elastic spring contact elements 223 and 224 formed on the interconnection member 220 where conductive traces or other internal connections connect one or more contact elements 223 to one or more contact elements 224. In the coplanar electrical connector illustrated in FIG. 13B, the two circuit elements (the FPC 225 and the FPC 227) are inserted from opposite directions and arranged coplanar with each other where each circuit element overlaps the interconnection member 220 but not overlapping each other.

In the above-described embodiments, the electrical connector of the present invention is configured as a floating connector that provides separable connections to a pair of circuit elements. In alternate embodiments, the electrical connector of the present invention is configured to provide a separable connection for a circuit element, such as an FPC, to interconnect to a rigid PCB or an electronic device module. In some embodiments, the electrical connector has a first end that is affixed or attached to a circuit element (such as a rigid PCB or an electronic device module) and a second end that provides a separable electrical connection. The first end of the electrical connector may be attached to the circuit element by solder connections, ball grid array solder connections, conductive adhesive interconnections, or other suitable fixed connection methods. In the present description, an electrical connector that has a first end mounted on a circuit element and a second end providing a separable connection is sometimes referred to as a "surface mount electrical connector."

Figure 14:
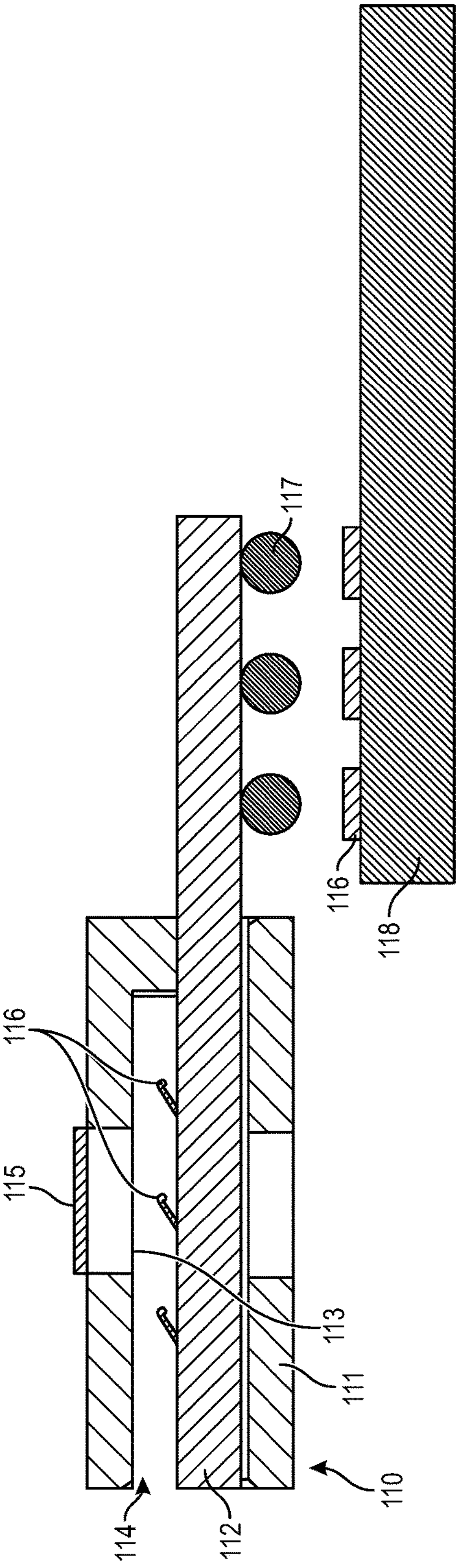
FIG. 14 is a cross-sectional diagram of a surface mount electrical connector for interconnecting two circuit elements in some embodiments.

FIG. 14 is a cross-sectional diagram of a surface mount electrical connector for interconnecting two circuit elements in some embodiments. In the present example, a surface mount electrical connector 110 is configured to interconnect an FPC to a rigid printed circuit board (PCB) 118. The electrical connector 110 includes a housing 111 with an internal bearing surface 113 and an insertion slot 114 to receive an FPC. The electrical connector 110 includes an interconnection member 112 with an array of elastic spring contact elements 116 formed thereon. The bearing surface 113 forces an inserted FPC (not shown) against the contact elements 116, compressing the contact elements against the interconnection terminals on the inserted FPC to form electrical interconnections. In the embodiment shown in FIG. 14, the interconnection member 112 extends beyond the housing 111 and includes interconnection terminals 117 formed on the extended portion for connecting to the circuit element 118, such as a rigid PCB. The interconnection terminals 117 are provided on an opposing surface of the interconnection member 112, opposite to the surface where contact elements 116 are formed. In the present embodiment, the interconnection terminals 117 are solder balls. In other embodiments, the interconnection terminals 117 may be solder, conductive adhesive, or other suitable material. At least one of the interconnection terminals 117 on the interconnection member 112 is connected electrically to at least one of the elastic spring contact elements 116, such as through a circuit trace or stamped circuit wire formed on the member 112. Interconnection terminals 117 are used to connect electrical connector 110 to the circuit element 118, such as a rigid PCB. For example, each interconnection terminal 117 may be connected to one or more conductive pads 116 formed on the circuit element 118. In other embodiments, the circuit element 118 may be another flexible printed circuit or an electronic device module. The interconnection terminals 117 are affixed to or mounted on the circuit element 118 in a manner that is non-separable. A retention clip 115 retains the inserted FPC in the insertion slot 114 in alignment with the contact elements 116.

Figure 15:
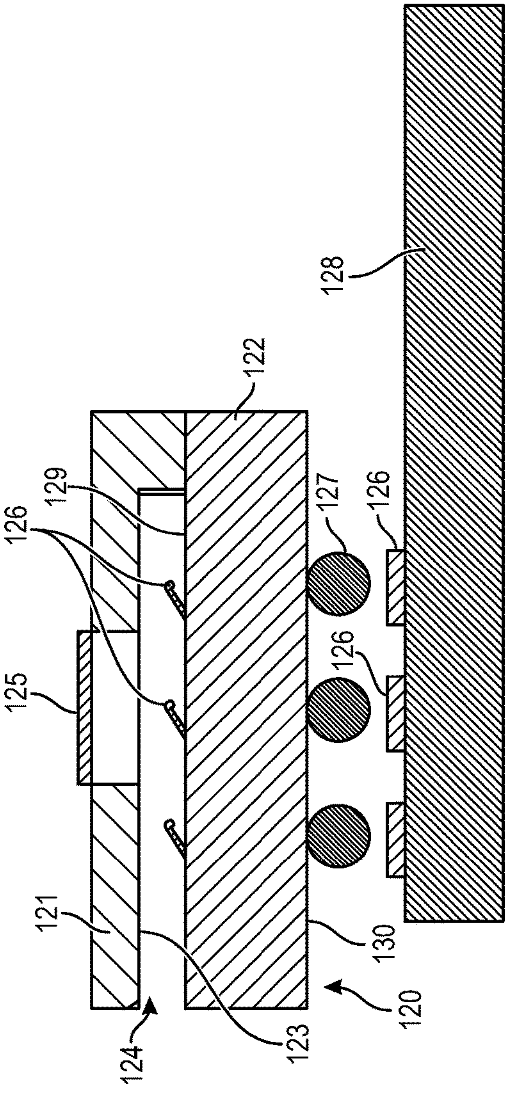
FIG. 15 is a cross-sectional diagram of a surface mount electrical connector for interconnecting two circuit elements in alternate embodiments.

FIG. 15 is a cross-sectional diagram of a surface mount electrical connector for interconnecting two circuit elements in alternate embodiments. FIG. 15 illustrates another configuration of a surface mount electrical connector in embodiments of the present invention. In the present example, a surface mount electrical connector 120 is configured to interconnect an FPC to a rigid printed circuit board (PCB) 128. The electrical connector 120 includes a housing 121 with an internal bearing surface 123 and an insertion slot 124 to receive an FPC. The electrical connector 120 includes an interconnection member 122 with an array of elastic spring contact elements 126 formed thereon. The bearing surface 123 forces an inserted FPC (not shown) against the contact elements 126, compressing the contact elements against the interconnection terminals on the inserted FPC to form electrical interconnections. In the embodiment shown in FIG. 15, the interconnection member 122 has a first surface 129 from which the contact elements 126 emanate and a second surface 130. Interconnection terminals 127 are formed on the second surface 130 for connecting to the circuit element 128, such as a rigid PCB. In the present embodiment, the interconnection terminals 127 are solder balls. In other embodiments, the interconnection terminals 127 may be solder, conductive adhesive, or other suitable material. At least one of the interconnection terminals 127 on the interconnection member 122 is connected electrically to at least one of the elastic spring contact elements 126, such as through a conductive via or circuit traces formed in the member 122. Interconnection terminals 127 are used to connect electrical connector 120 to the circuit element 128, such as a rigid PCB. For example, each interconnection terminal 127 may be connected to one or more conductive pads 126 formed on the circuit element 128. In other embodiments, the circuit element 128 may be another flexible printed circuit or an electronic device module. The interconnection terminals 127 are affixed to or mounted on the circuit element 128 in a manner that is non-separable. A retention clip 125 retains the inserted FPC in the insertion slot 124 in alignment with the contact elements 126.

In this detailed description, process steps described for one embodiment may be used in a different embodiment, even if the process steps are not expressly described in the different embodiment. When reference is made herein to a method including two or more defined steps, the defined steps can be carried out in any order or simultaneously, except where the context dictates or specific instruction otherwise are provided herein. Further, unless the context dictates or express instructions otherwise are provided, the method can also include one or more other steps carried out before any of the defined steps, between two of the defined steps, or after all the defined steps.

In this detailed description, various embodiments or examples of the present invention may be implemented in numerous ways, including as a process; an apparatus; a system; and a composition of matter. A detailed description of one or more embodiments of the invention is provided above along with accompanying figures that illustrate the principles of the invention. The invention is described in connection with such embodiments, but the invention is not limited to any embodiment. Numerous modifications and variations within the scope of the present invention are possible. The scope of the invention is limited only by the claims and the invention encompasses numerous alternatives, modifications, and equivalents. Numerous specific details are set forth in the description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured. The present invention is defined by the appended claims.

The invention claimed is:

1. An electrical connector for electrically interconnecting a first circuit element to a second circuit element, the electrical connector comprising:

a housing having a first insertion slot with an associated first bearing surface and a second insertion slot with an associated second bearing surface, the first and second insertion slots being provided on opposing ends of the housing; and an interconnection member provided in the housing, the interconnection member having a first plurality of contact elements provided on a first surface facing the first insertion slot and a second plurality of contact elements provided on a second surface facing the second insertion slot, the first surface being opposing the second surface, at least one contact element in the first plurality of contact elements being electrically connected to at least one contact element in the second plurality of contact elements, wherein the electrical connector is configured to receive the first circuit element in the first insertion slot and to receive the second circuit element in the second insertion slot, the first bearing surface applies a force normal to the first circuit element to compress the first circuit element against the first plurality of contact elements on the first surface of the interconnection member and the second bearing surface applies a force normal to the second circuit element to compress the second circuit element against the second plurality of contact elements on the second surface of the interconnection member.

2. The electrical connector of claim 1, wherein the first circuit element comprises a first set of interconnection terminals and the second circuit element comprises a second set of interconnection terminals, and wherein the first bearing surface applies the force normal to the first circuit element to compress the first set of interconnection terminals of the first circuit element against the first plurality of contact elements and the second bearing surface applies the force normal to the second circuit element to compress the second set of interconnection terminals of the second circuit element against the second plurality of contact elements.

3. The electrical connector of claim 1, wherein the first circuit element comprises a first flexible printed circuit (FPC) and the second circuit element comprises a second flexible printed circuit (FPC).

4. The electrical connector of claim 1, wherein each of the first and second circuit elements comprises a circuit element selected from flexible printed circuits (FPCs), flat flex cables, rigid-flex printed circuits, or an ultra-thin printed circuit substrate.

5. The electrical connector of claim 1, wherein the electrical connector is not attached to any structure in an electronic device other than the circuit elements inserted into the first and second insertion slots.

6. The electrical connector of claim 1, wherein each contact element in the first and second pluralities of contact elements comprises a compliant spring contact element.

7. The electrical connector of claim 6, wherein a first contact element in the first plurality of contact elements and a second contact element in the second plurality of contact elements comprise a pair of contact elements formed with a unitary structure.

8. The electrical connector of claim 1, wherein each contact element in the first and second pluralities of contact elements comprises a cantilever beam-like elastic contact element.

9. The electrical connector of claim 1, wherein the housing comprises a pair of detents formed on two sides of the housing, separate from the two ends, each detent matching corresponding detent formed on the first circuit element and the second circuit element.

10. The electrical connector of claim 9, further comprising a retention clip applied to the pair of detents in the housing to retain the first and second circuit elements in the housing and to maintain a compression force between the first and second bearing surfaces, the first and second circuit elements and the interconnection member.

11. The electrical connector of claim 1, wherein the first insertion slot and the second insertion slot are positioned with an offset in a direction normal to a planar surface of the interconnection member so that the first and second insertion slots overlap in the housing, the interconnection member being provided in the overlapped region.

12. The electrical connector of claim 1, wherein the first plurality of contact elements are provided emanating from the first surface and the second plurality of contact elements are provided emanating from the second surface, each contact element having a proximal end attached to the interconnection member and a distal end emanating above the first or second surfaces, wherein the contact elements in the first plurality of contact elements have distal ends pointing in an opposite direction as the distal ends of the contact elements of the second plurality of contact elements.

13. The electrical connector of claim 1, wherein the interconnection member comprises one or more conductive vias formed in a body of the interconnection member to connect a contact element formed on the first surface to at least one contact element formed on the second surface.

14. The electrical connector of claim 13, wherein the conductive vias each comprises a plated via, a via filled with a conductive material, or a via filled with a conductive paste.

15. The electrical connector of claim 1, wherein the interconnection member comprises the first surface facing the first insertion slot and the second surface facing the second insertion slot, the first surface and the second surface being coplanar, the first insertion slot and the second insertion slot being coplanar and the first bearing surface is the same as the second bearing surface.

16. The electrical connector of claim 15, further comprises:

a first insertion hard stop providing in a distant end of the first insertion slot, the first insertion hard stop limiting the insertion distance of the first circuit element to be inserted therein; and a second insertion hard stop providing in a distant end of the second insertion slot, the second insertion hard stop limiting the insertion distance of the second circuit element to be inserted therein.

17. The electrical connector of claim 16, wherein the first insertion slot abuts the second insertion slot in the housing, the slots being separated by a distance defined at least by the first and second insertion hard stops.

18. The electrical connector of claim 15, wherein the first plurality of contact elements are provided emanating from the first surface at an end near the first insertion slot and the second plurality of contact elements are provided emanating from the first surface at an end near the second insertion slot, each contact element having a proximal end attached to the interconnection member and a distal end emanating above the first surface, wherein the contact elements in the first plurality of contact elements have distal ends pointing in a direction towards the distal ends of the contact elements of the second plurality of contact elements.

19. The electrical connector of claim 18, wherein the interconnection member comprises one or more conductive traces formed in a body of the interconnection member to connect a contact element in the first plurality of contact elements to at least one contact element in the second plurality of contact elements.

20. The electrical connector of claim 15, wherein the housing comprises a first pair of detents and a second pair of detents formed on two sides of the housing, separate from the two ends, each detect matching a corresponding detent formed on the first circuit element or the second circuit element, the first pair of detents being positioned near the first insertion slot and the second pair of detents being positioned near the second insertion slot.

21. The electrical connector of claim 20, further comprising:

a first retention clip applied to the first pair of detents in the housing to retain the first circuit element in the housing and to maintain a compression force between the first bearing surface, the first circuit element and the interconnection member; and a second retention clip applied to the second pair of detents in the housing to retain the second circuit element in the housing and to maintain a compression force between the first bearing surface, the second circuit element and the interconnection member.

* * * * *